United States Patent
Takanashi (10) Patent No.: US 6,806,870 B1
(45) Date of Patent: Oct. 19, 2004

(54) IMAGE DISPLAY CONTROL APPARATUS INCLUDING ADJUSTMENT BASED ON BRIGHTNESS

(75) Inventor: Teruo Takanashi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/181,665

(22) Filed: Oct. 29, 1998

(30) Foreign Application Priority Data

Oct. 19, 1997 (JP) .............................................. 9-298839
Oct. 12, 1998 (JP) ........................................... 10-288995

(51) Int. Cl.$^7$ ................................................ G09G 5/00
(52) U.S. Cl. ...................... 345/207; 345/204; 345/212; 345/214
(58) Field of Search ............................... 345/204, 207, 345/211, 212, 214, 690; 348/518, 497, 536, 751, 744

(56) References Cited

U.S. PATENT DOCUMENTS

| | | | | |
|---|---|---|---|---|
| 5,483,260 A | * | 1/1996 | Parks et al. ................. | 345/156 |
| 5,528,307 A | * | 6/1996 | Owada et al. ............... | 348/497 |
| 5,550,556 A | * | 8/1996 | Wu et al. ...................... | 345/14 |
| 5,589,801 A | * | 12/1996 | Yamamura et al. ........... | 331/14 |
| 5,602,567 A | * | 2/1997 | Kanno .......................... | 345/132 |
| 5,627,596 A | * | 5/1997 | Shiramizu .................... | 348/536 |
| 5,650,607 A | * | 7/1997 | Kusaka ..................... | 250/201.8 |
| 5,847,701 A | * | 12/1998 | Eglit ........................... | 345/204 |
| 5,926,174 A | * | 7/1999 | Shibamiya et al. ......... | 345/213 |
| 6,075,513 A | * | 6/2000 | Reddy et al. ............... | 345/112 |
| 6,081,254 A | * | 6/2000 | Tanaka et al. .............. | 345/154 |

\* cited by examiner

*Primary Examiner*—Vijay Shankar
(74) *Attorney, Agent, or Firm*—Sughrue Mion, PLLC (57) ABSTRACT

A measurement image is displayed on a display based on inputted image data, and the measurement image displayed on a display image surface is photographed by a digital camera, and further, lightness of a previously-set measurement point is measured. Data is prepared comprised of a deviation between measurement data and the inputted image data, and image data obtained by reading an original is corrected based on the data comprised of the deviation, and further, the corrected data is inputted to the display and an image is thereby displayed on the display.

23 Claims, 8 Drawing Sheets

IMAGE DISPLAY CONTROL APPARATUS INCLUDING ADJUSTMENT BASED ON BRIGHTNESS

BACKGROUND OF THE INVENTION

1. Field of the Invention

The present invention relates to an image display control apparatus, and particularly to an image display control apparatus which can accurately display an image based on image data set in advance.

2. Description of the Related Art

Conventionally, an image forming apparatus, in which an image is formed by printing an image recorded on a photographic film onto a photosensitive material such as a photographic printing paper, is provided with a display device such as a display, which displays the image recorded on the photographic film. An operator indicates correction of the image and the like while visually observing the image displayed on the display device.

However, there arises a problem in that, due to deterioration of a display image surface of the display device with the passage of time, unevenness occurs in the image displayed based on image data obtained by reading the image recorded on the photographic film.

SUMMARY OF THE INVENTION

The present invention has been devised to solve the above-described problem, and an object thereof is to provide an image display control apparatus which can accurately display an image based on image data set in advance.

In order to achieve the above-described object, there is provided an image display control apparatus according to the present invention which comprises display means which displays an image based on inputted image data, measurement means which measures the lightness at a previously-set measurement point of the image displayed on the display means, data preparing means which prepares data comprised of a deviation, between photometric data measured by the measurement means and the image data inputted to the display means, correction means which corrects, based on the data prepared by the data preparing means, image data for an image to be displayed on the display means, and control means which inputs the image data corrected by the correction means to the display means and controls display of an image.

According to the present invention, the image display control apparatus is provided with the display means, which displays an image based on input image data. Inputted to the display means are, for example, image data obtained by reading a film image recorded on a photographic film or image data of a measurement image for measuring display unevenness and the like of the display means. The image display control apparatus is also provided with the measurement means for measuring the lightness at a measurement point, set in advance, of an image displayed on the display means (i.e., a measurement image). The measurement means can use image pick-up means which picks up the image displayed on the display means. Further, the measurement means can be comprised of image pick-up means which picks up the image displayed on the display means, output means which outputs, via a recording medium, an image picked up by the image pick-up means, and reading means which reads the image outputted via the recording medium.

The image display control apparatus is also provided with the data preparing means, which prepares the data comprised of a deviation between the measurement data and the image data. The data preparing means compares the photometric data of the lightness measured by the measurement means and the image data of the image displayed on the display means (i.e., the image data of the measurement image) and prepares data comprised of the deviation between the photometric data and the image data.

Further, the correction means provided in the image display control apparatus corrects the image data for the image to be displayed on the display means (for example, image data obtained by reading a film image recorded on a photographic film) based on the data comprised of the deviation. The control means controls, based on the image data corrected by the correction means, display of an image on the display means.

As described above, data comprised of the deviation in the display means is prepared, and based on the prepared data, the image data for the image to be displayed on the display means is corrected. Accordingly, the image can be accurately displayed.

Further, in the present invention, when at least one frame image is displayed on the display means, the measurement means measures lightness, with a point associated with the position of the frame image displayed on the display means as the measurement point. As a result, data of the deviation can be prepared for each frame image to be displayed, and therefore, display of each frame image can be controlled accurately and simply.

Accordingly, the present invention has an excellent effect in that by preparing data comprised of a deviation corresponding to the deterioration of display of the display means and by allowing the image data corrected based on the prepared data to be displayed on the display means, the image can be accurately displayed.

DESCRIPTION OF THE PREFERRED EMBODIMENT

Referring now to the attached drawings, an embodiment of the present invention will be hereinafter described in detail. First, a description will be given of a digital laboratory system 10 according to the embodiment of the present invention.

Figure 1:
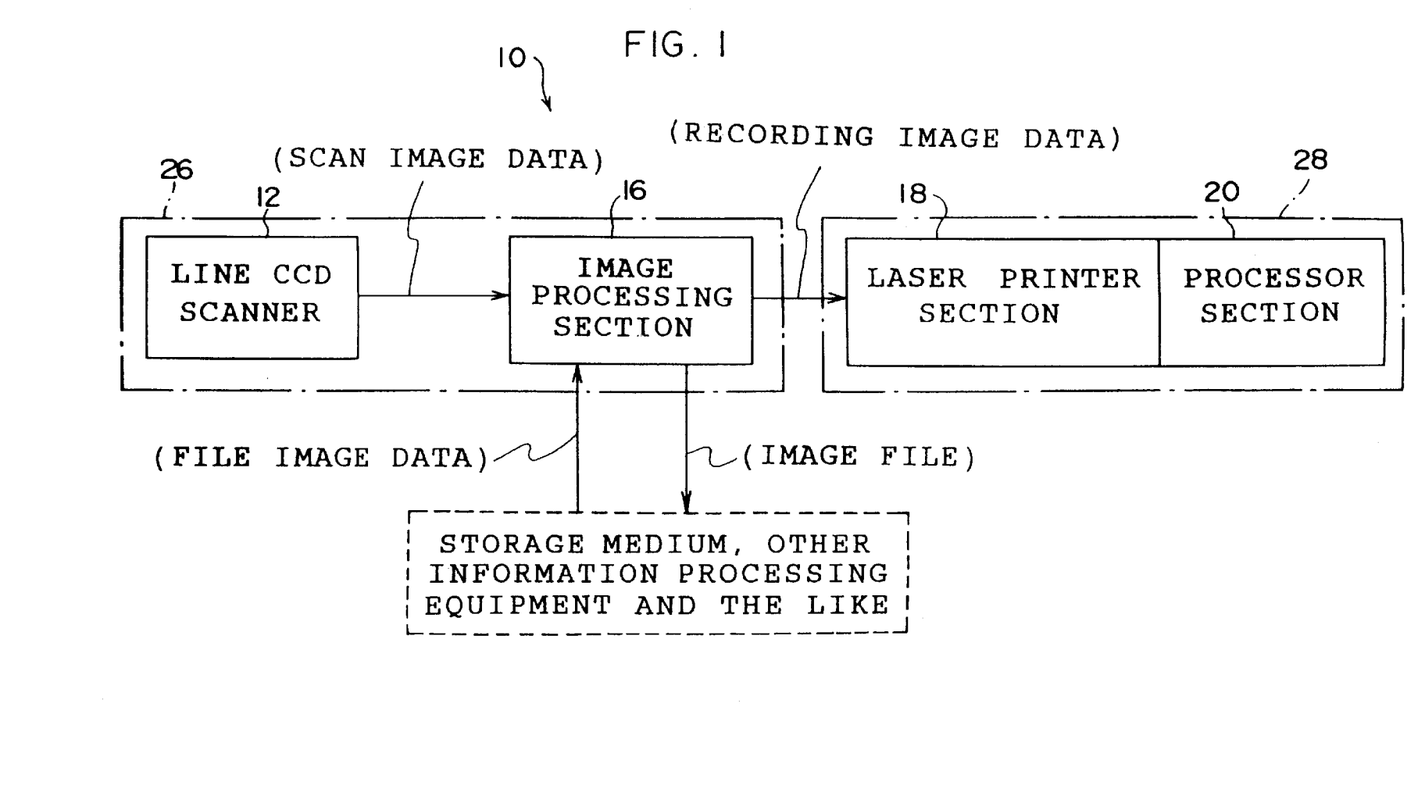
FIG. 1 is a schematic structural diagram of a digital laboratory system according to an embodiment of the present invention.
Figure 2:
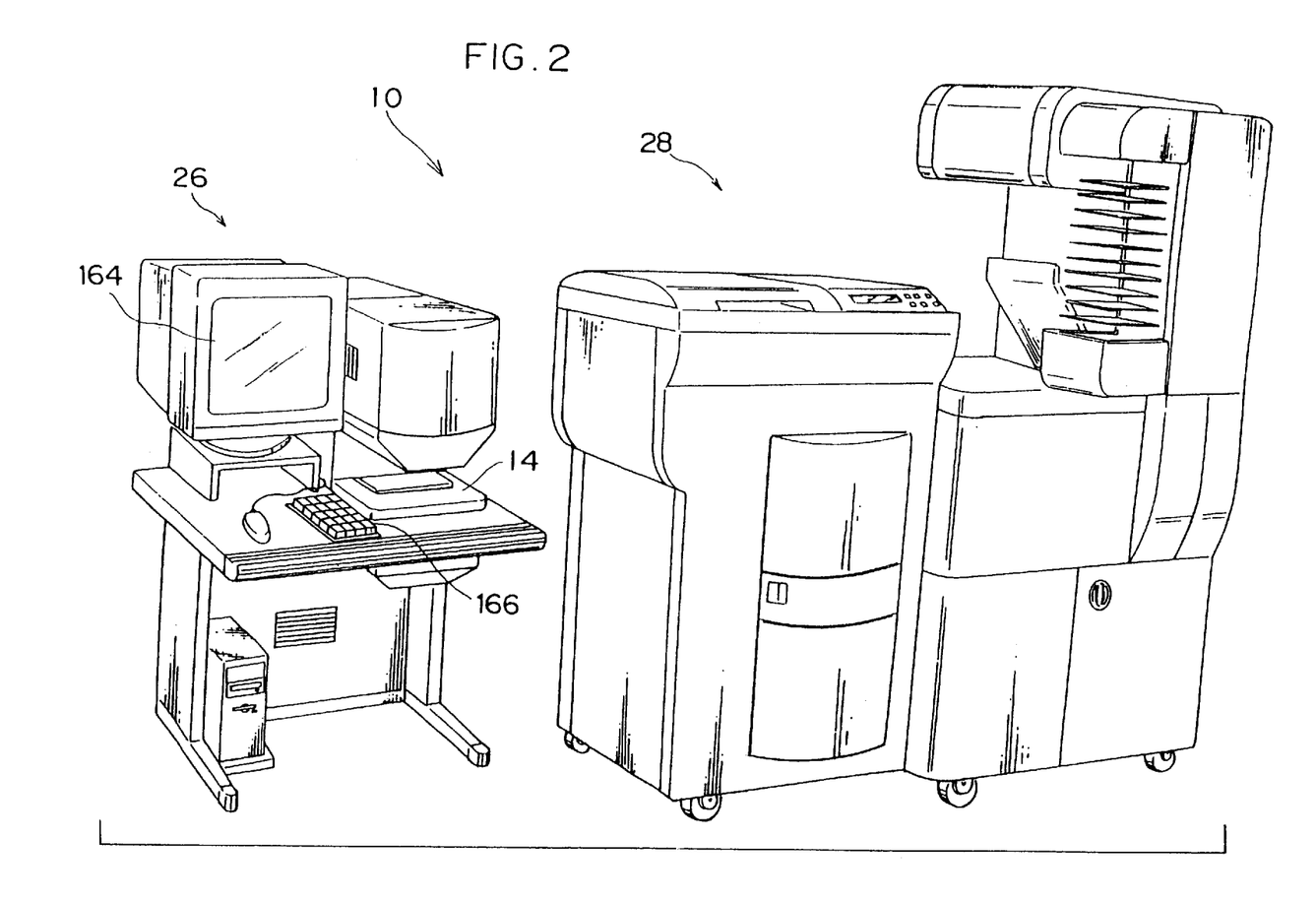
FIG. 2 is an outside view of the digital laboratory system.

Overview of an Entire System:

FIG. 1 shows a schematic structure of the digital laboratory system 10 according to the embodiment of the present invention. FIG. 2 shows the exterior appearance of the digital laboratory system 10. The digital laboratory system 10 is structured to include a line CCD scanner 12, an image processing section 16, a laser printer section 18, and a processor section 20. Further, as shown in FIG. 2, the line CCD scanner 12 and the image processing section 16 are provided in an input section 26 and the laser printer section 18 and the processor section 20 are provided in an output section 28.

The line CCD scanner 12 is used to read a film image recorded on a photographic film such as a negative film or a reversal film. Examples of the photographic film on which a film image to be read is recorded include a photographic film in 135 magazines, a photographic film in 110 magazines, and a photographic film with a transparent magnetic layer formed thereon (i.e., a photographic film in IX240 magazines: a so-called APS film), and photographic films in 120 magazines and 220 magazines (Brownie size). The line CCD scanner 12 includes a line CCD 74 (see FIG. 3) which is formed in such a manner that photometric sensors of R, G, and B are arranged in three rows. The line CCD scanner 12 reads a film image by the line CCD 74 and outputs image data of three colors of R, G, and B.

The image processing section 16 is structured to allow input of image data outputted from the line CCD scanner 12 (i.e., scan image data) and also allow input of image data obtained by photographing using a digital camera, image data obtained by reading an original other than the film image (for example, a reflection original) by a scanner, image data generated by a computer, and the like (which will be generically referred to as file image data) from the outside (for example, input of image data via a storage medium such as a memory card or input of image data from the other information processing equipment via a communication line).

The laser printer section 18 includes laser light sources which apply laser light of R, G, and B, respectively. The laser printer section 18 causes laser light modulated to correspond to the recording image data inputted from the image processing section 16 to be irradiated on a photographic printing paper and allows recording of an image on the photographic printing paper by scan exposure processing. Further, the processor section 20 effects various processes including color development, bleach-fix, washing, and drying for the photographic printing paper on which an image is recorded by scan exposure processing in the laser printer section 18. As a result, an image is formed on the photographic printing paper.

Figure 3:
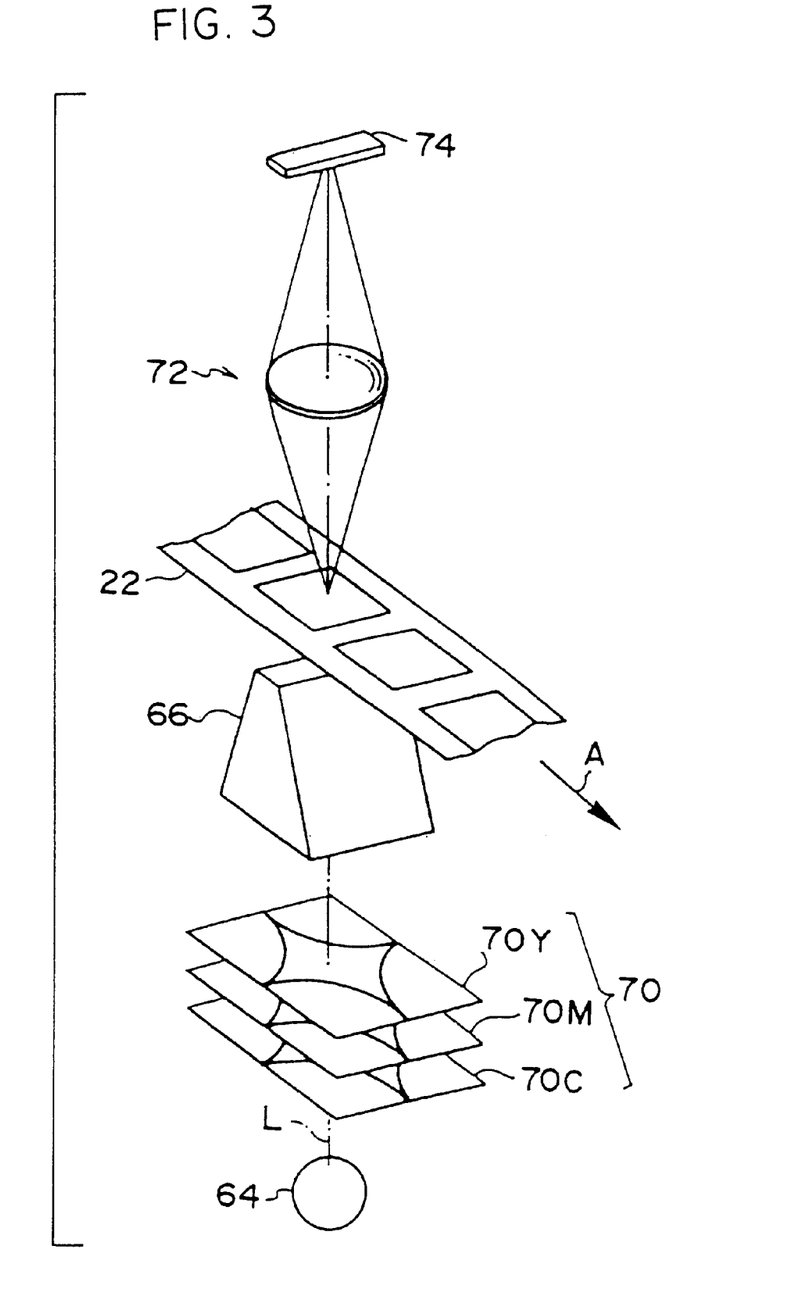
FIG. 3 is a schematic structural diagram of an optical system of a line CCD scanner.

Structure of Line CCD Scanner:

As shown in FIG. 3, an optical system of the line CCD scanner 12 is comprised of a halogen lamp or a metal halide lamp.

A light source 64 which applies light to the photographic film 22 and a light diffusion box 66 by which light to be irradiated on the photographic film 22 is made into diffused light are disposed sequentially along an optical axis L at a light emission side of the light source 64.

The photographic film 22 is conveyed by a film carrier 14 (shown in FIG. 2, but not shown in FIG. 3) disposed at a light emission side of the light diffusion box 66 so that each image surface of film images is made perpendicular to the optical axis.

Light adjusting filters 70C, 70M, and 70Y of cyan (C), magenta (M), and yellow (Y) are disposed between the light source 64 and the light diffusion box 66 sequentially along the optical axis of emitted light. The light adjusting filters 70C, 70M, and 70Y are provided so as to be independently movable and an amount by which each filter is inserted into an optical path can be adjusted by considering the balance of amounts of light of component colors emitted from the light source 64 or the sensitivity of the line CCD 74 to light of component colors. As a result, amounts of light of three colors of R, G, and B received by the line CCD 74 are adjusted.

A lens unit 72, which allows imaging of light transmitted through the film image, and a line CCD 74 are disposed sequentially along the optical axis, at the side of the photographic film 22 opposite to the side at which the light source 64 is disposed. Although in FIG. 3 a single lens is merely shown as the lens unit 72, the lens unit 72 may be a zoom lens formed from a plurality of lenses. The line CCD 74 is a three-line color CCD, in which CCD cells arranged in a line and made perpendicular to the direction in which the photographic film 22 is conveyed (i.e., the direction indicated by arrow A in FIG. 3) are provided in each of three lines. Color separation filters of R, G, and B are respectively mounted on the respective light-incidence sides of the three lines of the CCD cells. The line CCD 74 is disposed in such a manner that a light receiving surface thereof coincides with a position of an imaging point of the lens unit 72. Accordingly, a main scan for reading a film is effected along the direction in which these CCD cells are arranged, and a sub-scan for reading a film image is effected by the photographic film 22 being conveyed. The line CCD 74 is structured in such a manner that the CCD cells of three lines (rows of CCD cells) are disposed along the conveying direction of the photographic film 22 at predetermined intervals, and therefore, there is a difference in the time of detection between the component colors of R, G, and B in one and the same pixel. This difference in time is corrected by accumulating pixel data in a line memory and delaying output of the line memory while considering the difference in time.

Figure 4:
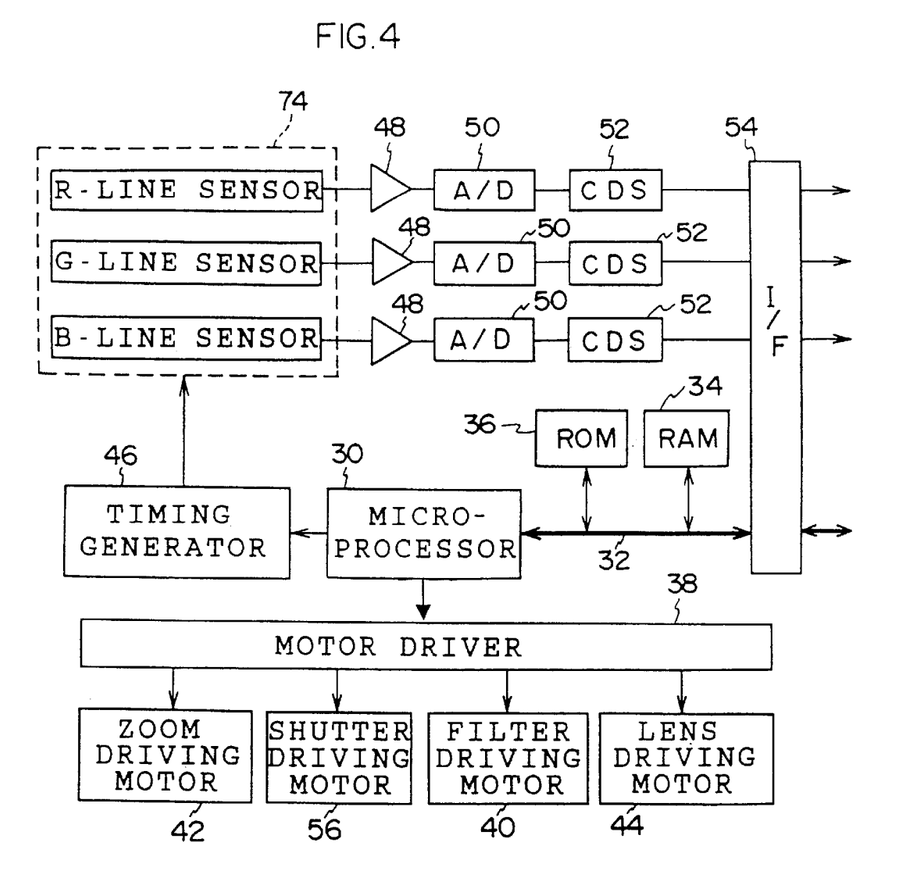
FIG. 4 is a schematic structural diagram of an electric system of the line CCD scanner.

FIG. 4 shows a schematic structure of an electric system of the line CCD scanner 12. The line CCD scanner 12 includes a microprocessor 30 which effects control of the entire line CCD scanner 12. RAM 34 (for example, SRAM), ROM 36 (for example, ROM which can rewrite the stored content) are connected via a bus 32 to the microprocessor 30, and a motor driver 38 is also connected to the microprocessor 30. A filter driving motor 40 is connected to the motor driver 38. The filter driving motor 40 allows the light adjusting filters 70C, 70M, and 70Y to slide-move independently.

The microprocessor 30 causes the light source 64 to be turned on and off accompanied with an on-off operation of a power source switch (not shown). Further, during reading of a film image by the line CCD 74 (i.e., photometric processing), the microprocessor 30 causes the filter driving motor 40 to slide-move the light adjusting filters 70C, 70M, and 70Y independently, so as to adjust an amount of light made incident on the line CCD 74 for each of light of component colors.

Also connected to the motor driver 38 are a zoom driving motor 42 and a lens driving motor 44. The zoom driving motor 42 varies a zoom magnification of the lens unit 72 by relatively moving the positions of the plurality of lenses of the lens unit 72. The lens driving motor 44 moves the position of an imaging point of the lens unit 72 along the optical axis by moving the entire lens unit 72. The microprocessor 30 varies the zoom magnification of the lens unit 72 by the zoom driving motor 42 to a desired magnification in accordance with a size of a film image or with or without trimming made.

A timing generator 46 is connected to the line CCD 74. The timing generator 46 generates various timing signals (clock signals) for operating the line CCD 74, an analog-digital (A/D) converter 50, which will be described later, and the like. Accordingly, the timing signals outputted from the timing generator 46 are used to allow reading of a film image.

Signal output ends of the line CCD 74 are connected to input ends of the A/D converters 50 via amplifiers 48. The signals outputted from the line CCD 74 are amplified by the amplifiers 48 and are converted to digital data in the A/D converters 50.

The output ends of the A/D converters 50 are each connected to an interface (I/F) circuit 54 via a correlated double sampling circuit (CDS) 52. The CDS 52 effects sampling of feed-through data which indicates the level of a feed-through signal and pixel data which indicates the level of a pixel signal and subtracts the feed-through data from the pixel data for each pixel. The calculated results (pixel data which respectively correspond correctly to the amounts of charge accumulated in the CCD cells) are sequentially outputted, as scan image data, to the image processing section 16 via the I/F circuit 54.

Meanwhile, photometric signals of R, G, and B are concurrently outputted from the line CCD 74, and therefore, three signal processing systems including the amplifiers 48, the A/D converters 50, and CDSs 52 are provided and image data of R, G, and B are concurrently outputted, as scan image data, from the I/F circuit 54.

Further, a shutter driving motor 56 which opens and closes a shutter (not shown) provided between the line CCD 74 and the lens unit 72 is connected to the motor driver 38. The dark output level of the line CCD 74 is corrected in an image processing section 16 at a subsequent stage, and when reading of the film image is not effected, the dark output level can be obtained by the microprocessor 30 closing the shutter.

Figure 5:
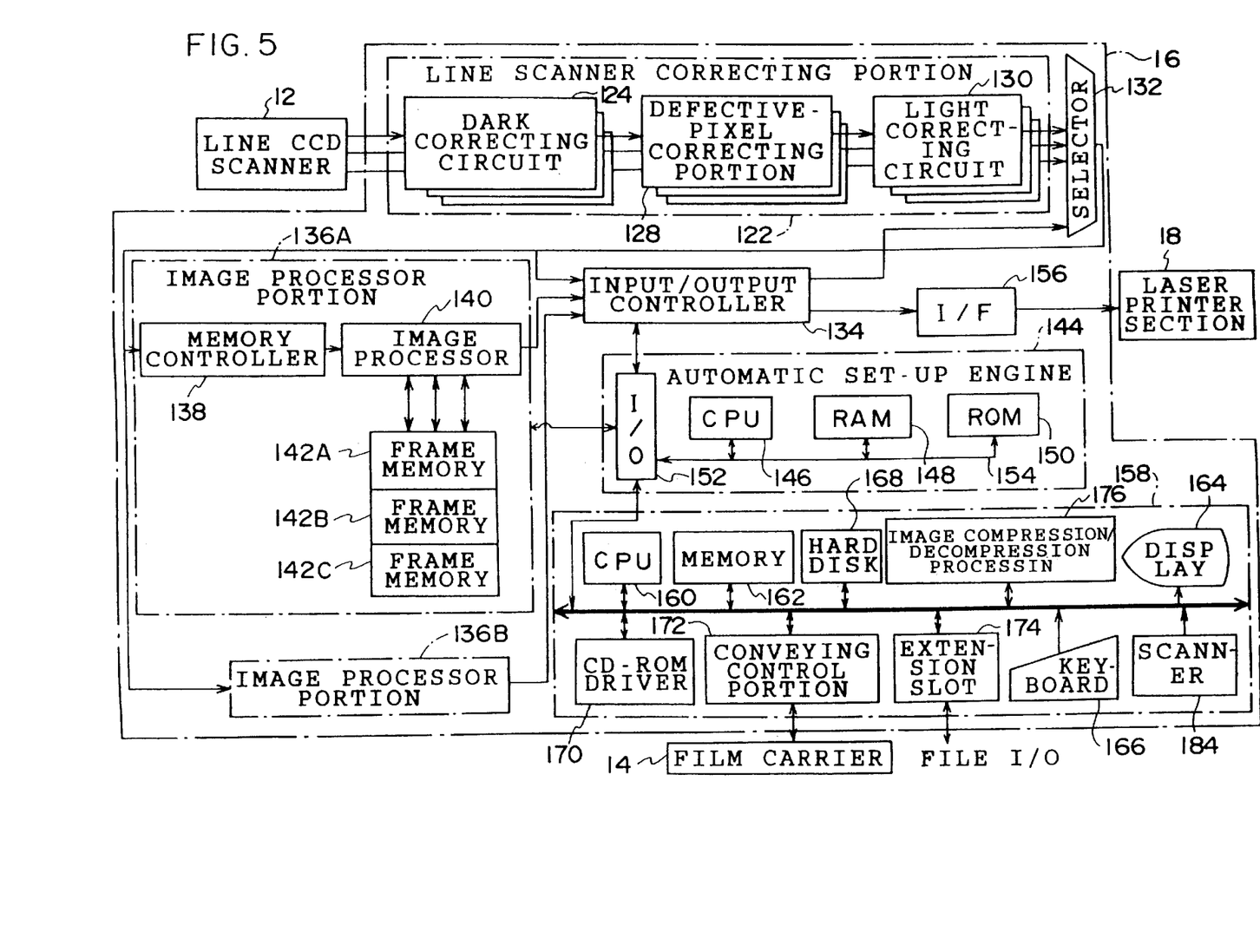
FIG. 5 is a schematic structural diagram of an image processing section.

Structure of Image Processing Section:

Next, a description will be given of the structure of the image processing section 16 with reference to FIG. 5. The image processing section 16 has a line scanner correcting portion 122 corresponding to the line CCD scanner 12. The line scanner correcting portion 122 includes three signal processing systems each having a dark correcting circuit 124, a defective-pixel correcting portion 128, and a light correcting circuit 130, correspondingly to image data of R, G, and B concurrently outputted from the line CCD scanner 12.

The dark correcting circuit 124 effects correction by storing, for each of cells, data inputted from the line CCD scanner 12 (i.e., data which represents a dark output level of each of cells of a sensing portion of the line CCD 74) in the state in which the light made incident on the line CCD 74 is cut off by the shutter, and also by subtracting the dark output level of a cell corresponding to each pixel from scan image data inputted from the line CCD scanner 12.

Further, the photoelectric conversion characteristic of the line CCD 74 varies for each of the cells. In the light correcting circuit 130 after the defective-pixel correcting portion 128, with an adjusting frame image whose entire image surface has a constant density being set on the line CCD scanner 12, a gain is set for each of the cells based on image data of the adjusting frame image inputted from the line CCD scanner 12 after the adjusting frame image has been read by the line CCD 74 (the variation in density between pixels represented by the image data results from variations of the photoelectric conversion characteristics of the cells), and image data of a frame image to be read inputted from the line CCD scanner 12 is corrected for each pixel in accordance with the gain set for each of the cells.

On the other hand, when the density of a specified pixel in the image data of the adjusting film image is greatly different from that of other pixels, there is some abnormality about the cell of the line CCD 74 corresponding to the specified pixel and it can be determined that the specified pixel is defective. The defective-pixel correcting portion 128 stores an address of the defective pixel based on the image data of the adjusting film image. Among the image data of the frame image to be read which is inputted from the line CCD scanner 12, data of the defective pixel is interpolated by data of peripheral pixels to allow generation of new data.

Further, the line CCD 74 is formed in three lines (rows of CCD cells) which are disposed along the conveying direction of the photographic film 22 at predetermined intervals, and therefore, there is the difference in time at which output of image data of each of component colors of R, G, and B from the line CCD scanner 12 starts between these component colors. The line scanner correcting portion 122 delays the image-data output timing based on different delay times of the component colors so that image data of R, G, and B of the same pixel on the frame image are outputted simultaneously.

Output ends of the line scanner correcting portion 122 are connected to input ends of a selector 132 and image data outputted from the correcting portion 122 is inputted to the selector 132. The input end of the selector 132 is also connected to a data output end of an input/output controller 134 and external-input file image data is inputted from the input/output controller 134 to the selector 132. An output end of the selector 132 is connected to each data input end of the input/output controller 134 and image processor portions 136A and 136B. The selector 132 allows the inputted image data to be selectively outputted to any one of the input/output controller 134 and the image processor portions 136A and 136B.

The image processor portion 136A includes a memory controller 138, an image processor 140, and three frame memories 142A, 142B, and 142C. The frame memories 142A, 142B, and 142C each have a capacity which allows storage of image data of a frame image of one frame. The image data inputted from the selector 132 is stored in any one of the three frame memories 142A, 142B, and 142C and the memory controller 138 controls an address when the image data is stored in the frame memory so that each pixel data of the inputted image data is stored in a storage region of the frame memory in such a state as to be arranged in a fixed order.

The image processor 140 fetches image data stored in the frame memory and effects various image processing including gradation conversion, color conversion, hyper-tone processing which compresses gradation of extra-low frequency luminance components of an image, hyper-sharpness processing which highlights sharpness while suppressing granularity, and the like. Meanwhile, the processing condition of the above-described image processing is automatically calculated by an automatic set-up engine 144 (which will be described later) and the image processing is effected in accordance with the calculated processing condition. The image processor 140 is connected to the input/output controller 134, and after the image data subjected to the image processing is temporarily stored in the frame memory 142, the image data is outputted to the input/output controller 134 at a predetermined timing. The image processor portion 136B has the same structure as that of the above-described image processor portion 136A, and a description thereof will be omitted.

In the present embodiment, two reading operations of different resolutions are effected for each frame image in the line CCD scanner 12. In the case of the first reading operation at a relatively low resolution (which will be referred to as "pre-scan"), even when the density of a frame image is extremely low (for example, even when an over-exposed negative image on a negative film is used), reading of the frame image is effected under a reading condition which is determined so as to prevent occurrence of saturation of accumulated charge in the line CCD 74 (the amount of light irradiated on the photographic film for each wavelength of light of the colors R, G, and B, and the time of charge accumulated in the CCD). The image data obtained by the pre-scan (i.e., pre-scan image data) is inputted from the selector 132 to the input/output controller 134 and is also outputted to the automatic set-up engine 144 connected to the input/output controller 134.

The automatic set-up engine 144 includes CPU 146, RAM 148 (for example, DRAM), ROM 150 (for example, ROM which can rewrite the stored content), and an input/output port 152, which are connected together via a bus 154.

The automatic set-up engine 144 determines, based on pre-scan image data of frame images of a plurality of frames inputted from the input/output controller 134, a reading condition in the second reading operation by the line CCD scanner 12 at a relatively high resolution (which will be hereinafter referred to as "fine scan"), and calculates a processing condition of the image processing for image data obtained by the fine scan (fine-scan image data), and further outputs the calculated processing condition to the image processor 140 of the image processor portion 136. In the calculation of the processing condition of the image processing, it is determined from an exposure amount during photographing, a type of a light source for photographing, and other characteristic amount, whether a plurality of frame images with similar scenes photographed exists. When the plurality of frame images with similar scenes photographed exists, the processing condition of image processing for fine-scan image data of these frame images is determined so as to become identical or approximate.

Meanwhile, an optimum processing condition of image processing varies depending on whether image data after image processing is used for recording of an image on a photographic printing paper in the laser printer section 18 or is outputted externally. The image processing section 16 includes two image processor portions 136A, 136B. For example, when image data is used for recording of an image on a photographic printing paper and is also outputted externally, the automatic set-up engine 144 calculates a processing condition most suitable for each of various purposes and outputs the calculated processing condition to the image processor portions 136A, 136B. As a result, in the image processor portions 136A, 136B, image processing is effected for the same fine-scan image data under different processing conditions.

Moreover, the automatic set-up engine 144 calculates, based on pre-scan image data of the frame image inputted from the input/output controller 134, an image-recording parameter which defines gray balance when an image is recorded on a photographic printing paper in the laser printer section 18, and outputs the calculated parameter simultaneously with outputting of recording image data (described later) to the laser printer section 18. Further, the automatic set-up engine 144 calculates a processing condition for image processing for file image data inputted from the outside in the same way as the aforementioned.

The input/output controller 134 is connected via an I/F circuit 156 to the laser printer section 18. When the image data after image processing is used for recording of an image on a photographic printing paper, the image data subjected to image processing in the image processor portion 136 is outputted, as recording image data, from the input/output controller 134 to the laser printer section 18 via the I/F circuit 156. Further, the automatic set-up engine 144 is connected to a personal computer 158. When the image data subjected to image processing is outputted externally as an image file, the image data subjected to image processing in the image processor portion 136 is outputted from the input/output controller 134 to the personal computer 158 via the automatic set-up engine 144.

The personal computer 158 includes a CPU 160, a memory 162, a display 164, a keyboard 166 (also seen in FIG. 2), a hard disk 168, a CD-ROM driver 170, a conveying control portion 172, an extension slot 174, an image compression/extension portion 176, a digital camera 180, a printer 182, and a scanner 184. These components are connected together via a bus 178.

The conveying control portion 172 is connected to the film carrier 14 and controls conveying of the photographic film 22 effected by the film carrier 14. Further, when an APS film is set in the film carrier 14, information read from the magnetic layer of the APS film by the film carrier 14 (for example, image record size) is inputted.

A driver (not shown) which effects data reading/writing for a storage medium such as a memory card, or a communication control device which communicates with other information processing equipment is connected via the extension slot 174 to the personal computer 158. When image data to be outputted externally is inputted from the input/output controller 134, the image data is outputted, as an image file, to the outside (for example, to the above-described driver or communication control device) via the extension slot 174. Further, when file image data is inputted from the outside via the extension slot 174, the inputted file image data is outputted to the input/output controller 134 via the automatic set-up engine 144. In this case, the input/output controller 134 outputs the inputted file image data to the selector 132.

Further, when the image processing section 16 outputs scan image data such as pre-scan image data or fine scan image data to the personal computer 158 and causes a film image read by the line CCD scanner 12 to be displayed on the display 164, and correction of the image, or the like is indicated by an operator via the keyboard 166, the correction of the image can also be reflected in the processing condition for image processing. When the image is displayed on the display 164, display deterioration may occur in the image displayed on the display 164 based on scan image data, due to the deterioration with the passage of time in the display 164. Namely, the image displayed on the display 164 based on the scan image data or the like includes pixels of which density is different from that of the film image read by the line CCD scanner 12, and therefore, the film image may not be accurately displayed on the display 164. Accordingly, when the film image read by the line CCD scanner 12 is displayed on the display 164, the scan image data read by the line CCD scanner 12 and inputted to the personal computer 158 should be corrected and displayed by considering the display deterioration of the display 164.

The above-described display deterioration includes display unevenness resulting from density unevenness and color irregularity, color displacement of three primary colors of R, G, and B, poor focus, deviation from the aspect ratio, image distortion, and the like.

A description will be hereinafter given of a case in which display unevenness is corrected.

Figure 6:
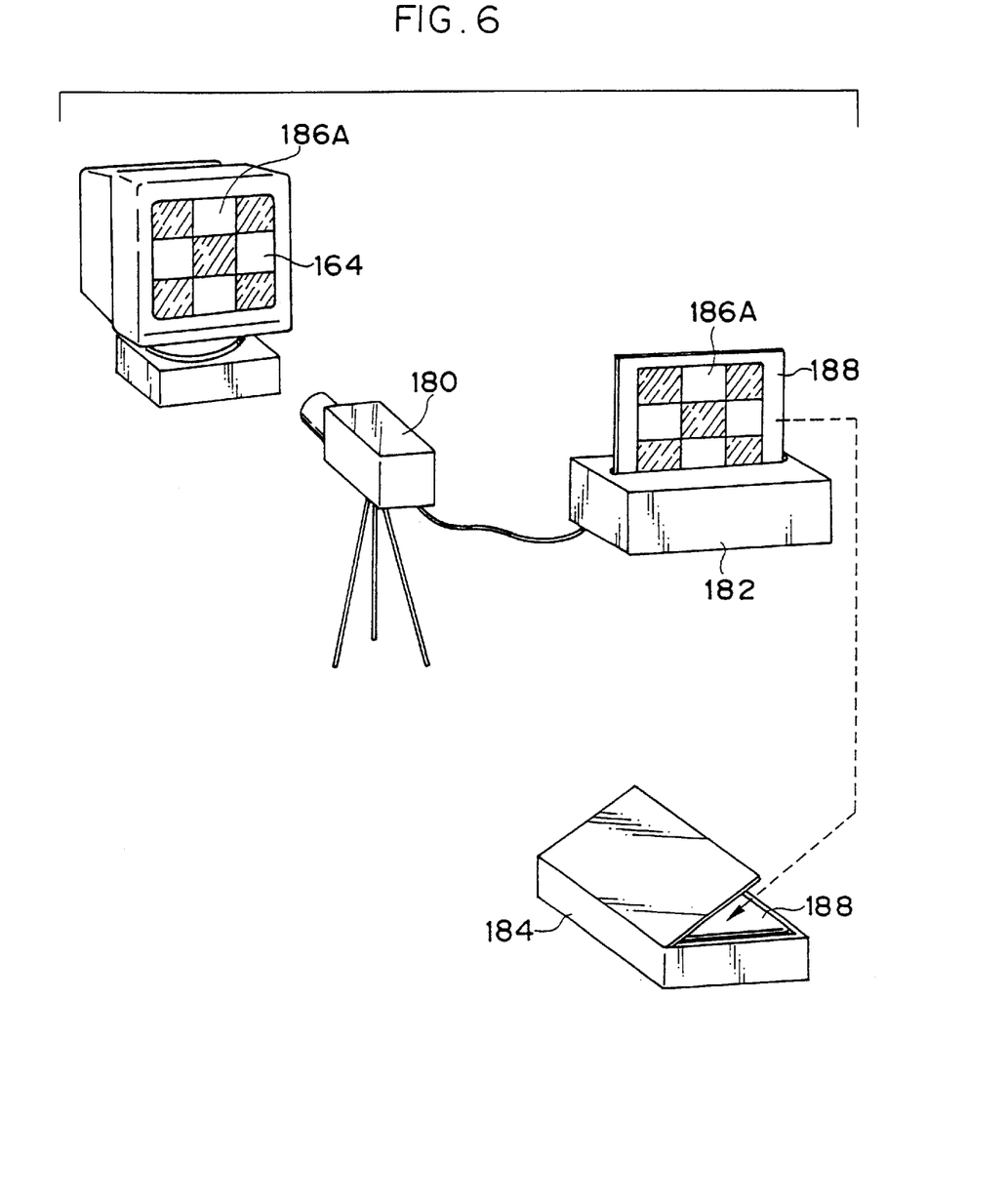
FIG. 6 is a schematic diagram which shows a device required to effect correction of scan image data.

As shown in FIG. 6, a digital camera 180 for picking up an image displayed on the display 164, a display unevenness measurement image 186A displayed on the display 164, for example, is disposed at the front side of the display 164 so as to correct the scan image data displayed on the display 164. Further, the digital camera 180 is connected to the outputting printer 182 which records and outputs the picked-up display unevenness measurement image 186A on a recording medium such as a paper 188. The printer 182 is connected to the scanner 184 which reads the display unevenness measurement image 186A recorded on the paper 188. The scanner 184 is connected to the bus 178 of the personal computer 158 as illustrated in FIG. 5.

Figure 8:
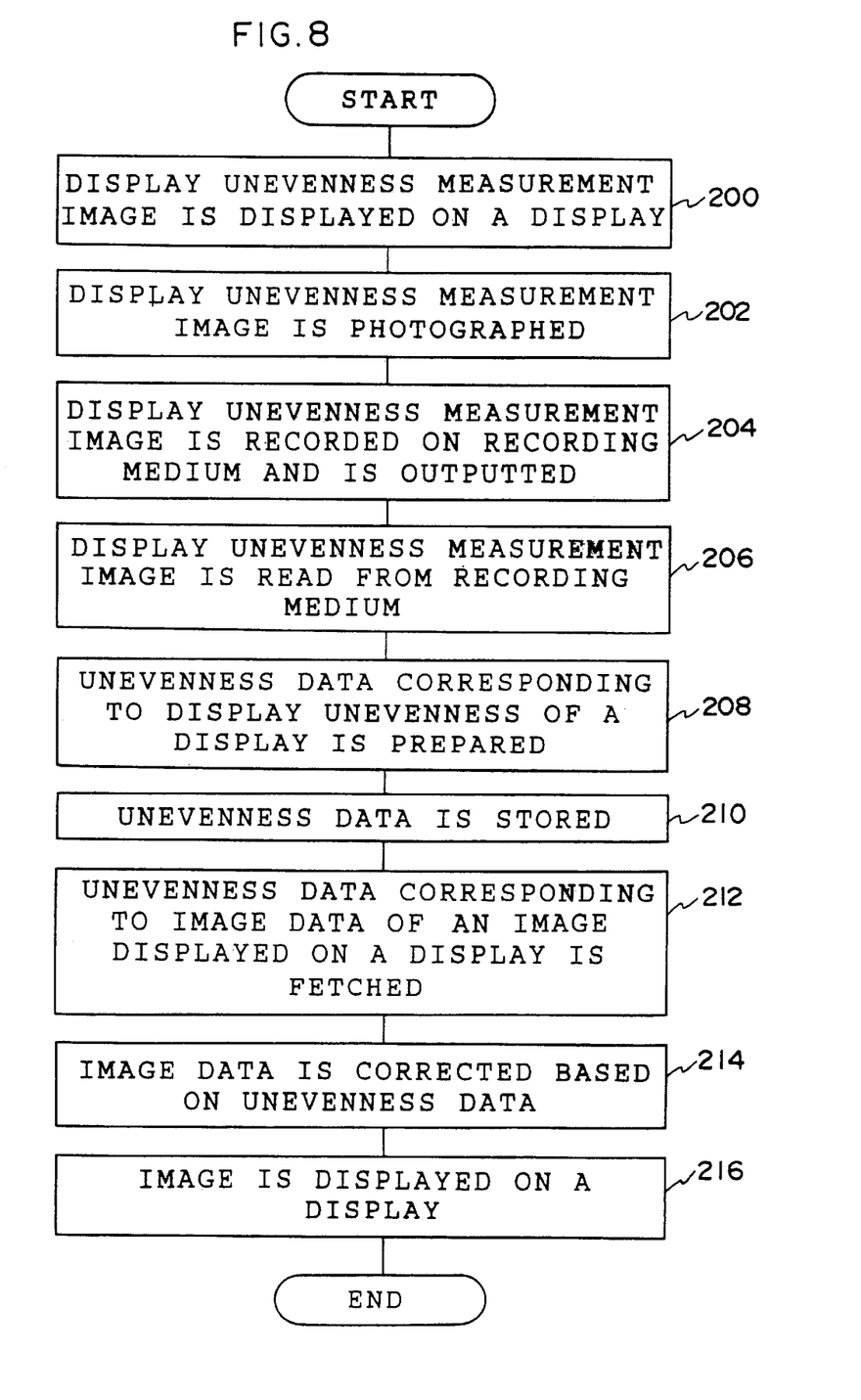
FIG. 8 is a flow chart which shows a control routine in the embodiment of the present invention.

Operation of the Present Embodiment:

Next, an operation of the present embodiment will be described with reference to the flow chart shown in FIG. 8. A correction processing for the scan image data, which is shown in FIG. 8, is executed prior to reading of a film image recorded on the photographic film 22 in the line CCD scanner 12. The correction processing is preferably executed periodically, for example, every morning.

Figure 7:
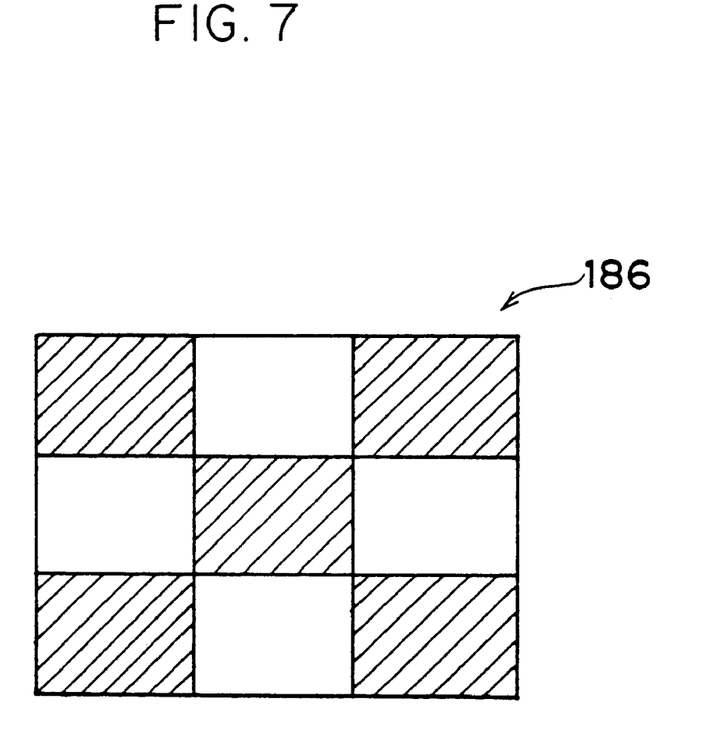
FIG. 7 is a schematic diagram which shows a display unevenness measurement image.

In step 200, a display unevenness measurement image 186 (see FIG. 7) determined in advance is displayed on the display 164. As shown in FIG. 7, as the display unevenness measurement image 186, there is used an image in which a gray region (for example, 30% gray) of which color balance of R, G, and B is fixed is formed at each of four corners and at the center thereof. When display unevenness occurs due to the deterioration in the display 164 with the passage of time or the like, the color balance of R, G, and B of the display unevenness measurement image 186A displayed on the display 164 changes and a pixel with an altered lightness is generated. Namely, unevenness occurs in the display unevenness measurement image 186A displayed on the display 164.

In step 202, the display unevenness measurement image 186A displayed on the display 164 is picked up by the digital camera 180. In the present embodiment, the display unevenness measurement image 186A is picked up by an operator manually operating the digital camera 180. Further, in step 204, the display unevenness measurement image 186A picked up by the digital camera 180 is outputted to the paper 188 by the printer 182. In step 206, the display unevenness measurement image 186A recorded on the paper 188 is read by the scanner 184. As a result, the lightness of each pixel of the display unevenness measurement image 186A is photometrically measured.

Subsequently, in step 208, each of the respective pixels of the photometric data of the display unevenness measurement image 186A read in step 206 and the image data of the display unevenness measurement image 186A are compared with each other, and unevenness data corresponding to the display unevenness of the display 164 is prepared. The unevenness data is comprised of data of a pixel having a deviation of a predetermined value or more, between the photometric data of the display unevenness measurement image 186A read by the scanner 184 and the image data of the display unevenness measurement image 186. For regions other than the gray regions in the display unevenness measurement image 186, i.e., regions other than measurement points of the photometric data, unevenness data thereof is prepared by interpolating the unevenness data that was prepared.

In step 210, the unevenness data prepared in step 208 is stored in the hard disk 168 provided in the personal computer 158. In a case in which an image recorded on a photographic film is displayed, in step 212, the unevenness data corresponding to the scan image data of the image to be displayed on the display 164 (for example, the pre-scan image data or the fine scan image data) is fetched from the hard disk 168.

In step 214, the scan image data is corrected based on the unevenness data fetched in step 212 (shading correction). In step 216, an image is displayed on the display 164 based on the corrected scan image data, and the process in this flow chart ends.

As described above, the unevenness data corresponding to display unevenness of the display 164 is prepared, and based on the prepared unevenness data, the pre-scan or fine-scan image data is corrected and the image is displayed. For this reason, even when display unevenness occurs in the display 164, a film image read by the line CCD scanner 12 can be accurately displayed.

Meanwhile, in the present embodiment, there was described as an example a case in which the unevenness data is prepared using the photometric data of each pixel of the display unevenness measurement image 186A, but the present invention is not limited to the same. For example, the unevenness data may be prepared using photometric data of each pixel of the display unevenness measurement image 186A for each of the colors of R, G, and B.

Further, in the foregoing, there was also described as an example a case in which the unevenness data is prepared by picking up the display unevenness measurement image 186A displayed on the display 164 using the digital camera 180 and outputting the picked-up display unevenness measurement image 186A to the paper 188 using the printer 182 and also reading the measurement image using the scanner 184, but the present invention is not limited to the same. For example, the unevenness data may be prepared directly from image data of the display unevenness measurement image 186A obtained by picking up an image using the digital camera 180. As a result, providing the printer 182 or the scanner 184 becomes unnecessary, and therefore, the number of component parts of the apparatus can be reduced.

Moreover, in the present embodiment, there was described as an example a case in which the unevenness data is prepared in such a manner that the display unevenness measurement image 186A displayed on the display 164 is picked up by the operator manually operating the digital camera 180 and predetermined processing is carried out, but the present invention is not limited to the same. For example, in place of the digital camera 180, a measuring device which can move in x-axis and y-axis directions to measure the lightness of each pixel of the display unevenness measurement image 186A displayed on the display 164 may be disposed at the front side of the display 164. As a result, the unevenness data can be prepared by periodically and automatically measuring the lightness of each pixel of the display unevenness measurement image 186A displayed on the display 164. Accordingly, labor is not imposed on the operator and maneuverability can be improved.

In the present embodiment, the scanner 184 for reading the display unevenness measurement image 186A outputted to the paper 188 is provided separately. However, the line CCD scanner 12 for reading a film image may be used, for reading an elongated film like paper on which the display unevenness measurement image 186A is outputted.

In the foregoing, although there was described a case in which the display unevenness was corrected, color displacement of R, G, and B can be corrected in such a manner as described below. Data of a measurement image in which respective points of R, G, and B are disposed at a previously-set interval is inputted and an image, in which the respective points of R, G, and B are disposed, is displayed on a display image surface. The image displayed on the display image surface is photographed by the digital camera 180 and each interval of the respective points of R, G, and B is measured from the photographic data. Subsequently, a deviation between an interval of the points on the measurement image and measured interval of the points is calculated, and with the deviation set as an amount of displacement, the data of the image to be displayed on the display image surface is corrected based on the amount of displacement, and an image is displayed on the display 164 based on the corrected image data.

In a case of correcting poor focus, first, data of a measurement image, in which a large number of points are disposed, is inputted and displayed on the display image surface. An image displayed on the display image surface is photographed by a digital camera and the degree of dispersion of points displayed on the image surface is measured from photographic data. As a result, the amount of displacement of each measurement point with respect to a corresponding point of the measurement image is obtained, and data for an image to be displayed on the display image surface is corrected based on the amount of displacement, and further, an image is displayed on the display based on corrected image data. The degree of dispersion can be measured as a diameter of a point of a binary image, by setting a threshold value to convert a photographic image to the binary image.

In a case of correcting a deviation from the aspect ratio, a measurement image having a predetermined aspect ratio is displayed on the display image surface and the actual longitudinal and transverse dimensions of the measurement image are measured on the display image surface. As a result, a deviation between the measurement image and the measured actual dimensions is obtained, and based on the deviation, an image to be displayed on the display image surface is corrected and displayed, in the same manner as described above.

In a case of correcting distortion, a deviation between a linear measurement image (reference image) and the value actually measured of an image displayed on the display image surface is obtained, and based on the deviation, the degree of distortion is calculated. In the same manner as described above, an image to be displayed on the display image surface is corrected and displayed, by using the calculated degree of distortion.

Correction of an image to be displayed on the display image surface may be effected by offsetting the entire image or by correcting only peripheries of each measurement point.

In the foregoing, there was described a case in which an image to be displayed on the display image surface is corrected by using five measurement points of a measurement image. However, when any one of images of the first, fourth, sixth, twenty-eighth, and fortieth frames is selected and displayed on a display, a measurement point is provided so as to allow the frame image to correspond to a position where it is to be displayed, and data comprised of a deviation in the periphery of the measurement point is obtained, thereby allowing display of an image to be displayed on the display image surface.

What is claimed is:

1. An image display control apparatus comprising:
    display means which displays an image based on inputted image data;
    measurement means which measures a lightness at a previously-set measurement point of the image displayed on said display means;
    data preparing means which prepares data comprising a deviation, between photometric data measured by said measurement means and the image data inputted to said display means;
    correction means which corrects, based on the data prepared by said data preparing means, image data for an image to be displayed on said display means; and
    control means which inputs the image data corrected by said correction means to said display means and controls display of an image.

2. An image display control apparatus according to claim 1, wherein when at least one frame image is displayed on said display means, said measurement means measures lightness, of a point associated with a position of the frame image displayed on said display means as the measurement point.

3. An image display control apparatus according to claim 1, wherein said measurement means comprises an image pick-up means for picking up the image displayed on said display means.

4. An image display control apparatus according to claim 1, wherein said measurement means includes:
    image pick-up means which picks up the image displayed on said display means;
    output means which outputs via a recording medium the image picked up by said image pick-up means; and
    reading means which reads an image outputted via the recording medium.

5. An image display control apparatus according to claim 1, wherein the image measured by said measurement means is a previously-set measurement image.

6. An image display control apparatus according to claim 1, further comprising:
    a scanner which effects a pre-scan in which an original is read at a lower resolution and a fine scan in which, after the pre-scan, the original is read at a high resolution,
    wherein said correction means corrects image data read by the fine scan, based on data prepared by said data preparing means.

7. An image display control apparatus comprising:
    display device which displays an image based on inputted image data;
    measurement device which measures a lightness at a previously-set measurement point of the image displayed on said display device; and
    control device which prepares data comprising a deviation between photometric data measured by said measurement device and the image data inputted to said display device, corrects image data for an image to be displayed on said display device based on the deviation, and inputs the corrected image data to said display device, and controls display of an image.

8. An image display control apparatus according to claim 7, wherein when at least one frame image is displayed on said display device, said measurement device measures lightness of a point associated with a position of the frame image displayed on said display device as the measurement point.

9. An image display control apparatus according to claim 7, wherein said measurement device comprises an image pick-up device which picks up the image displayed on said display device.

10. An image display control apparatus according to claim 7, wherein said measurement device includes:
    image pick-up device which picks up the image displayed on said display device;

output device which outputs via a recording medium the image picked up by said image pick-up device; and reading device which reads an image outputted via the recording medium.

11. An image display control apparatus according to claim 7, wherein the image measured by said measurement device is a previously-set measurement image.

12. An image display control apparatus according to claim 7, further comprising:

a scanner which effects a pre-scan in which an original is read at a lower resolution and a fine scan in which, after the pre-scan, the original is read at a high resolution, wherein said control device corrects image data read by the fine scan, based on data comprising the deviation.

13. An image display control method comprising steps of:

measuring a lightness at a previously-set measurement point of an image displayed on a display device;

preparing data comprising a deviation between photometric measured lightness data and the image data inputted to the display device;

correcting image data for an image to be displayed on the display device based on the deviation; and inputting the corrected image data to said display device and controlling display of an image.

14. An image display control method according to claim 13, wherein when at least one frame image is displayed on said display device, lightness of a point associated with a position of the frame image displayed on said display device as the measurement point is measured.

15. An image display control method according to claim 13, wherein the measured image is a previously-set measurement image.

16. An image display control method according to claim 13, further comprising the step of:

effecting a pre-scan in which an original is read at a lower resolution and a fine scan in which, after the pre-scan, the original is read at a high resolution, wherein image data read by the fine scan is corrected, based on the deviation.

17. An image display control apparatus according to claim 5, wherein the previously-set measurement image is an image, in which a gray region of which color balance of R, G, and B is fixed, is formed at one of four corners and a center of a displaying surface of said display means.

18. An image display control apparatus according to claim 11, wherein the previously-set measurement image is an image, in which a gray region of which color balance of R, G, and B is fixed, is formed at one of four comers and a center of a displaying surface of said display device.

19. An image display control apparatus according to claim 1, wherein the data comprising the deviation is data which represents at least one of density unevenness, poor focus, deviation from the aspect ratio, and distortion.

20. An image display control apparatus according to claim 7, wherein the data comprising the deviation is data which represents at least one of density unevenness, poor focus, deviation from the aspect ratio, and distortion.

21. An image display control apparatus according to claim 1, wherein the data comprising of the deviation is data which represents at least one of density unevenness, color irregularity, color displacement of three primary colors, poor focus, deviation from the aspect ratio, and distortion.

22. An image display control apparatus according to claim 7, wherein the data comprising the deviation is data which represents at least one of density unevenness, color irregularity, color displacement of three primary colors, poor focus, deviation from the aspect ration, and distortion.

23. An image display control method according to claim 13, wherein the data comprising the deviation is data which represents at least one of density unevenness, poor focus, deviation from the aspect ratio, and distortion.

* * * * *